(12) United States Patent
Okochi

(10) Patent No.: US 7,670,251 B2
(45) Date of Patent: Mar. 2, 2010

(54) BICYCLE HUB GEARBOX

(75) Inventor: Hiroyuki Okochi, Osaka (JP)

(73) Assignee: Shimano Inc., Osaka (JP)

( * ) Notice: Subject to any disclaimer, the term of this patent is extended or adjusted under 35 U.S.C. 154(b) by 451 days.

(21) Appl. No.: 11/697,338

(22) Filed: Apr. 6, 2007

(65) Prior Publication Data

US 2007/0254768 A1    Nov. 1, 2007

(30) Foreign Application Priority Data

Apr. 28, 2006  (EP) .................................. 06008957

(51) Int. Cl.
*F16H 3/44* (2006.01)
(52) U.S. Cl. ...................... 475/297; 475/330
(58) Field of Classification Search ........................ None
See application file for complete search history.

(56) References Cited

U.S. PATENT DOCUMENTS

| | | | | |
|---|---|---|---|---|
| 3,366,206 | A * | 1/1968 | Shimano | 192/217.4 |
| 3,886,811 | A * | 6/1975 | Hillyer | 475/297 |
| 4,052,914 | A * | 10/1977 | Nakajima | 475/285 |
| 4,973,297 | A | 11/1990 | Bergles et al. | |
| 5,273,500 | A * | 12/1993 | Nagano | 475/312 |
| 5,322,487 | A | 6/1994 | Nagano et al. | |
| 5,527,230 | A | 6/1996 | Meier-Burkamp | |
| 7,448,979 | B2 * | 11/2008 | Chen | 475/297 |
| 2003/0017905 | A1 * | 1/2003 | Butz | 475/296 |

FOREIGN PATENT DOCUMENTS

| | | |
|---|---|---|
| DE | 4324935 A1 | 2/1994 |
| DE | 19518052 C1 | 11/1996 |
| DE | 102004014239 A1 | 10/2005 |
| EP | 0383350 | 8/1990 |
| EP | 0657347 | 6/1995 |
| EP | 0658475 | 6/1995 |
| EP | 0795460 | 9/1997 |
| EP | 0795461 | 9/1997 |
| EP | 0834685 | 4/1998 |
| EP | 1413509 | 4/2004 |
| GB | 2275512 | 8/1994 |
| GB | 2300888 | 11/1996 |

\* cited by examiner

*Primary Examiner*—David D Le
*Assistant Examiner*—Justin Holmes
(74) *Attorney, Agent, or Firm*—Global IP Counsels, LLP

(57) ABSTRACT

A bicycle hub gearbox is provided for a multi-speed hub with a coaster brake mechanism. The bicycle hub gearbox basically has a first planetary gear mechanism, a second planetary gear mechanism, a braking mechanism and a clutch mechanism. The second planetary gear mechanism is operatively coupled with the first planetary gear mechanism. The braking mechanism is selectively coupled to the first planetary gear mechanism. The clutch mechanism selectively couples an output side of the first planetary gear mechanism to an input side of the second planetary gear mechanism to selectively transmit either a driving torque applied by a rider in a driving direction depending on a selected gear ratio or a braking torque applied by the rider in a braking direction to the braking mechanism independent of a selected gear ratio via one path such that a resulting braking effect is substantially equal independent of the selected gear ratio.

19 Claims, 17 Drawing Sheets

BICYCLE HUB GEARBOX

CROSS-REFERENCE TO RELATED APPLICATIONS

This application claims priority under 35 U.S.C. §119 to European Patent Application No. 06 008 957.8, filed Apr. 28, 2006. The entire disclosure of European Patent Application No. 06 008 957.8 is hereby incorporated herein by reference.

BACKGROUND OF THE INVENTION

1. Field of the Invention

This invention generally relates to a bicycle hub gearbox for a multi-speed hub, for example, for a bicycle. More specifically, the present invention relates to a bicycle hub gearbox with at least a pair of planetary gear mechanisms as well as a coaster brake mechanism.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle drive train.

Many bicycle hub assemblies include an internal power transmission mechanism having two or more power transmission paths, with each path being defined by unique gear combinations through which torque is transmitted. One example of three-speed hub gearbox with a planetary gear mechanism and a coaster brake mechanism is disclosed in European Patent Publication No. 795 461 B1. The arrangement known from this publication comprises substantially a fixed shaft, a driver, a hub sleeve, a coaster brake unit as well as a mechanism for transmission of the driving torque from the driver to the hub sleeve. The transmission mechanism comprises especially a planetary gear mechanism and a clutch arrangement, which can be actuated in a longitudinally displaceable manner and which is arranged on the driven side of the planetary gear mechanism. On the one hand, a driving torque can be transmitted in three different gear ratios through control of the clutch arrangement. On the other hand, a braking torque applied by a rider can be transmitted, such that the resulting braking force is essentially not influenced by the selected gear ratio. The interconnection of the clutch mechanism, the planetary gear mechanism and the coaster brake unit is designed for a three-speed hub.

An example a five-speed hub gearbox with a coaster brake mechanism is disclosed in European Patent Publication No. 0 383 350. This bicycle hub gearbox includes essentially a fixed shaft, a driving member, a hub sleeve, a coaster brake unit as well as a mechanism for transmission of the driving torque from the driving member to the hub sleeve. The transmission mechanism includes especially a planetary gear mechanism controllable by using sun gear clutches and a complicated clutch arrangement, arranged on the driven side of the planetary gear mechanism, whereby a driving torque can be transmitted to the hub sleeve in different gear ratios. However, it is unfavorable t hat a braking effect, which results from a braking torque applied by a rider, depends on the gear ratio selected at the time of braking. The resulting braking effect can be consequently larger or smaller than that intended by the rider.

In view of the above, it will be apparent to those skilled in the art from this disclosure that there exists a need for an improved bicycle hub gearbox. This invention addresses this need in the art as well as other needs, which will become apparent to those skilled in the art from this disclosure.

SUMMARY OF THE INVENTION

One object of the present invention is to improve a bicycle hub gearbox with a coaster brake mechanism for a multi-speed hub. Especially, the braking operation should occur more securely and more comfortably for a rider and a simple, compact hub gearbox should be provided having a slim structure, which is still reliable in operation.

Further, the gear change should occur more comfortably for a rider and consequently the riding feel during the gear change should be improved.

In accordance with one aspect of the present invention a bicycle hub gearbox is provided that basically comprises a first planetary gear mechanism, a second planetary gear mechanism, a braking mechanism and a clutch mechanism. The second planetary gear mechanism is operatively coupled with the first planetary gear mechanism. The braking mechanism is selectively coupled to the first planetary gear mechanism. The clutch mechanism selectively couples an output side of the first planetary gear mechanism to an input side of the second planetary gear mechanism to selectively transmit either a driving torque applied by a rider in a driving direction depending on a selected gear ratio or a braking torque applied by the rider in a braking direction to the braking mechanism independent of a selected gear ratio via one path.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
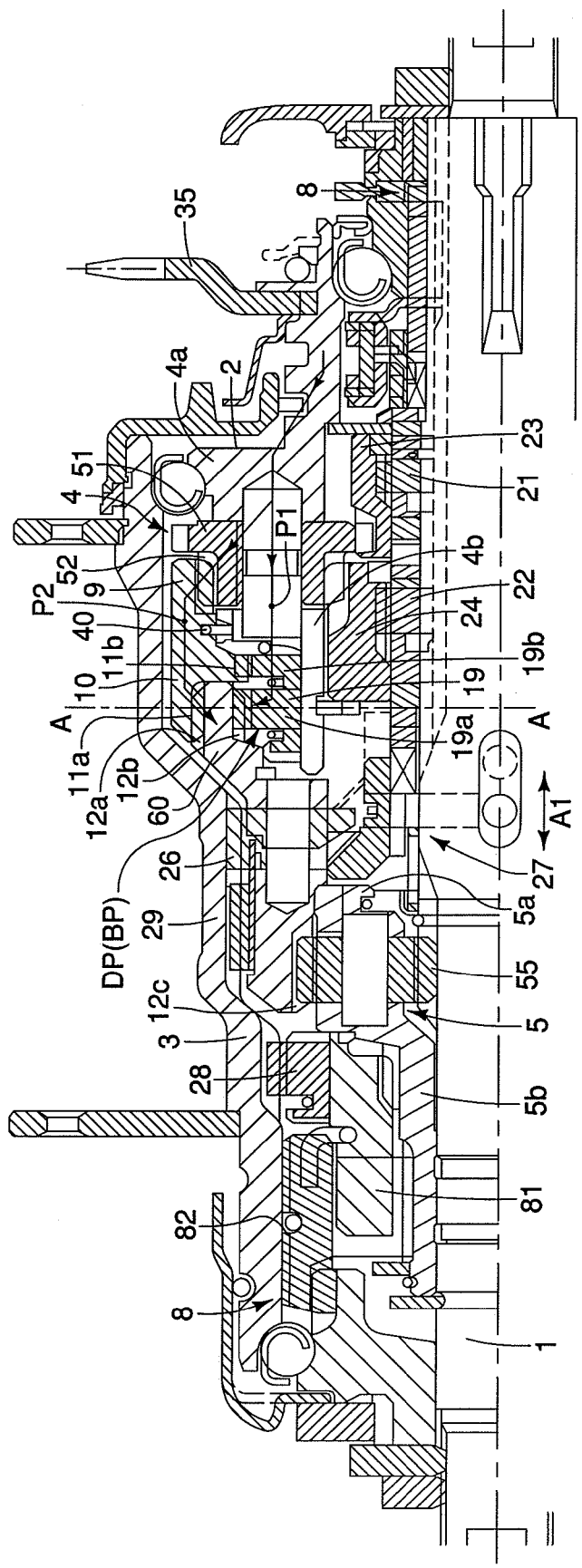
FIG. 1 is a partial longitudinal cross sectional view of a bicycle hub gearbox with a coaster brake mechanism incorporated in a multi-speed hub of a bicycle according to the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1 to 20, a bicycle multi-speed hub is illustrated that is equipped with a hub gearbox having a coaster brake mechanism in accordance with a first embodiment of the present invention.

The illustrated construction substantially includes, but not limited to, a fixed shaft 1 secured to a bicycle frame, a rotatable driving member 2, a rotatable hub sleeve 3, a first planetary gear mechanism 4, a second planetary gear mechanism 5, a first output clutch 26, a second output clutch 28, an output selector 27, a sprocket 35, and a linking member 60.

The first planetary gear mechanism 4 includes a preferably integrally-formed planet gear carrier which has an input side part 4a and an output side part 4b. In the present embodiment, the input side part 4a of the planet gear carrier 4a, 4b serves as the driving member 2 driven by the chain wheel 35. The first planetary gear mechanism 4 has a first sun gear 23 and a second sun gear 24, both of which are supported on the fixed shaft 1 so as to be immovably in longitudinal direction. The first sun gear 23 can be brought into engagement with a plurality of first planet gears 51 (only one shown) and the second sun gear 24 with a plurality of second planet gears 52 (only one shown). The first planet gears 51 have a larger diameter than the second planet gear 52. A sun gear clutch 21 is arranged between the sun gear 23 and the fixed shaft 1, while a sun gear clutch 22 is arranged between the sun gear 24 and the fixed shaft 1. The sun gear clutches 21 and 22 can be selectively brought into engagement with the fixed shaft 1 such that a driving torque is transmitted or not transmitted to the sun gears 11 and 12. The sun gear clutches 21 and 22, and thus, the first planetary gear mechanism 4 can be operated by using a control device 8 such that a plurality of gear ratios results. The sun gear clutches 21 and 22 are controlled by a control device 8 which is provided at the fixed shaft 1 and actuated by pulling a wire or the like (not shown) from the outside, wherein a rotational movement of the control device 8 results in an activation or deactivation of the sun gear clutches 21 and 22. The planetary gear mechanism 4 is formed in a two-step manner. In particular, the planetary gear mechanism 4 has planet gear pairs, which have planet gears 51, 52 with different diameters.

The second planetary gear mechanism 5 has a plurality of planet gears 55 (only one shown) and a planet gear carrier, which includes an input side part 5a and an output side part 5b. The second planetary gear mechanism 5 is formed in a one-step manner. Therefore, the second planetary gear mechanism 5 does not have planet gears with different diameters. Moreover, the second planetary gear mechanism 5 is not controlled by using a sun gear clutch. A roller case 81 is arranged between the output side part 5b of the planet gear carrier 5a, 5b of the second planetary gear mechanism 5 and the hub sleeve 3. The roller case 81 is connected to an output clutch 28 that can be formed as a one way clutch, with a plurality of brake parts 82. Depending on the rotating direction of the planet gear carrier 5a, 5b, either the output clutch 28 is active, (i.e., transmitting a driving torque), or the brake parts 82 are active (i.e., transmitting a braking torque). When the brake parts 82 are active, the brake parts 82 are pushed radially outwards, and thus, a braking action takes place. The planet gear carrier 4a, 4b of the first planetary gear mechanism 4 as well as the planet gear carrier 5a, 5b of the second planetary gear mechanism 5 are preferably formed integrally as a unit.

Further, a clutch mechanism is provided, which is coupled with the first planetary gear mechanism 4 on the output side. This clutch mechanism transmits a driving torque applied by a rider in the driving direction depending on a selected gear ratio or transmits a braking torque applied by a rider in the braking direction independent of the selected gear ratio via a path P1 (or BP1) to the braking mechanism such that the resulting braking effect is substantially the same for each selected gear ratio, i.e., the resulting braking effect is independent of the selected gear ratio.

Figure 2:
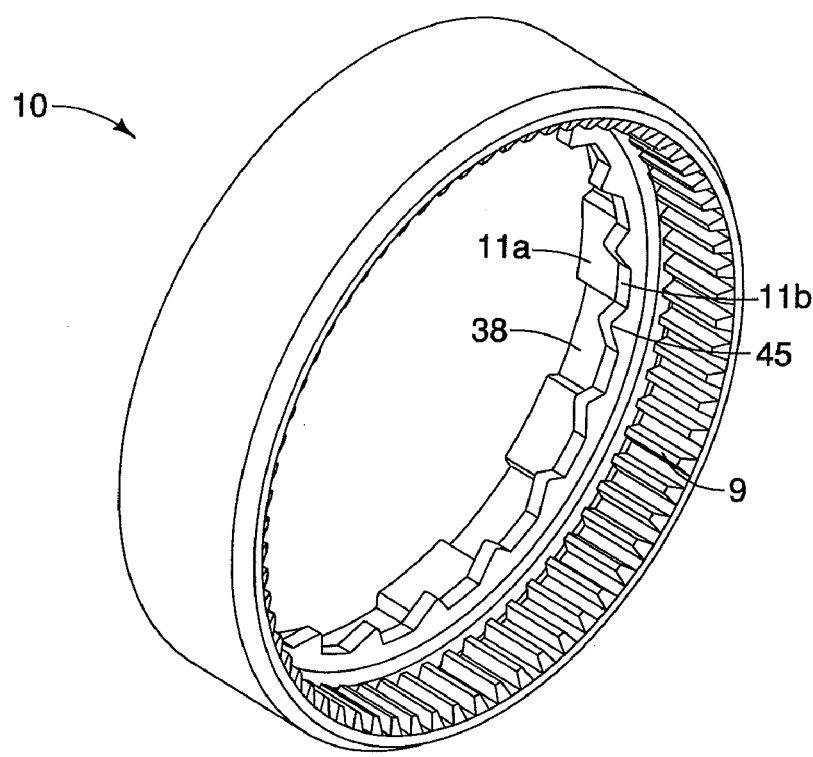
FIG. 2 is a perspective view of a ring gear of the hub gearbox according to the present invention.
Figure 3:
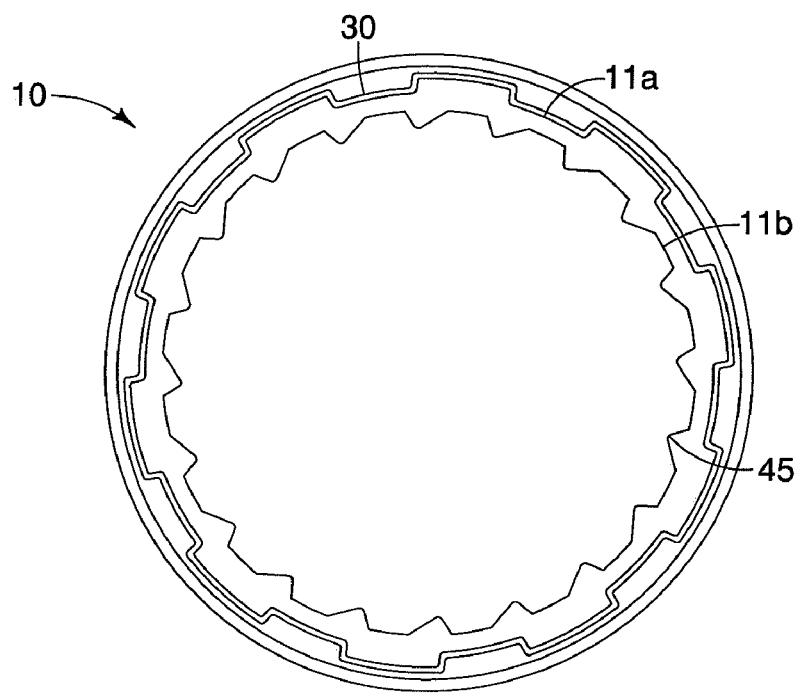
FIG. 3 is a side elevational view of the ring gear of the hub gearbox according to the present invention.

As seen in FIGS. 2 and 3, the clutch mechanism includes a ring gear 10 with an input side toothed ring part 9 and an output side toothed ring part arrangement 11a, 11b. The input side toothed ring part 9 is provided at an inner circumferential surface of the ring gear 10, and adapted to engage with the output side planet gears 52 of the first planetary gear mechanism 4. The output side toothed ring part arrangement 11a, 11b includes two toothed ring parts 11a, 11b offset in axial direction that are provided at an inner circumferential surface of the ring gear 10. The first toothed ring part 11a is provided at the output side end of the ring gear 10. The second toothed ring part 11b is provided at the input side adjacent to first toothed ring part 11a. As shown, for example, in FIG. 2, the projections (or teeth) and the recesses (or tooth spacings) of the toothed ring parts 11a, 11b and 9 of the ring gear 10 are respectively arranged substantially uniformly in the circumferential direction.

Figure 4:
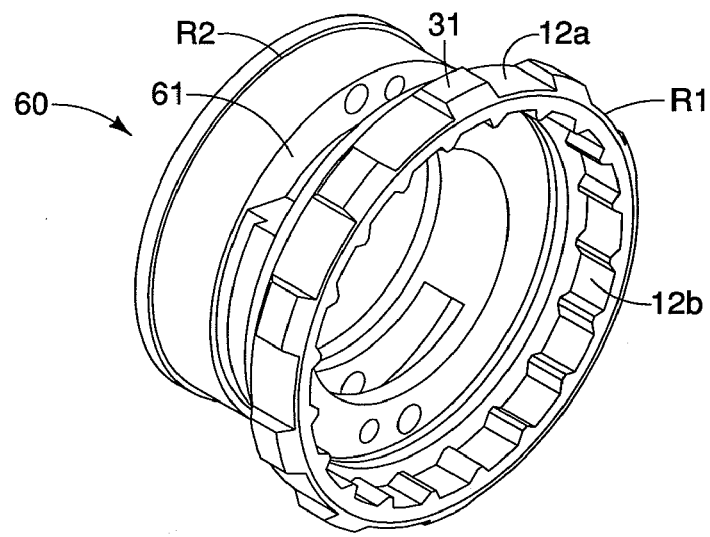
FIG. 4 is a perspective view of a linking member of the hub gearbox according to the present invention.
Figure 5:
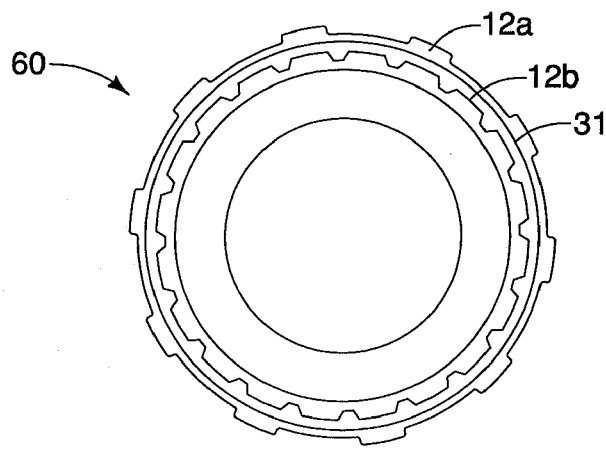
FIG. 5 is a front elevational view of the linking member of the hub gearbox according to the present invention.
Figure 6:
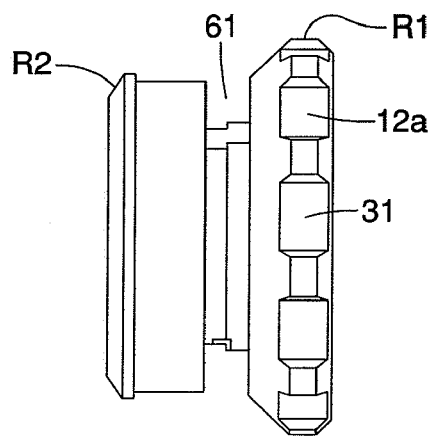
FIG. 6 is a side elevational view of the linking member of the hub gearbox according to the present invention.

Further, the clutch mechanism further includes the linking member 60, which is a tubular member that is preferably integrally-formed as a one-piece, unitary member. The linking member 60 forms an operative connection to the second planetary gear mechanism 5 or to gearing parts arranged output side with reference to the clutch mechanism. As shown in FIGS. 4, 5 and 6, the linking member 60 has a first toothed ring part 12a, which is provided on an external circumferential surface at the input side end of the linking member 60. The first toothed ring part 12a is adapted to engage with the first toothed ring part 11a of the toothed ring part arrangement 11a, 11b of the ring gear 10. Furthermore, the linking member 60 has a second toothed ring part 12b, which is provided at an inner circumferential surface at the input side end of the linking member 60. As shown, for example, in FIG. 4, the projections (teeth) and the recesses (tooth spacings) of the toothed ring parts 12a and 12b of the linking member 60 are arranged substantially uniformly in circumferential direction.

The output side part 4b of the planet gear carrier 4a, 4b of the first planetary gear mechanism 4 is also involved in the clutch mechanism, the output side part 4b is selectively connected in a torque transferring manner to the second toothed ring part 12b of the linking member 60 by using a clutch 19. The clutch 19 includes a pair of driving pawls DP and a pair of braking pawl BP. As seen in FIG. 1, the driving pawls DP and the braking pawls BP overlap so as to be partially aligned in the axially direction of the shaft 1. The braking pawls BP have a first braking pawl part 19a and a second braking pawl part 19b. The first braking pawl part 19a overlaps with the driving pawls DP so as to be partially aligned in the axially direction of the shaft 1. The second braking pawl part 19a is offset with respect to the driving pawls DP in the axially direction of the shaft 1. The first braking pawl part 19a are arranged to operatively engage the second toothed ring part 11b of the toothed ring part arrangement 11a, 11b of the ring gear 10, while the second braking pawl part 19a and the driving pawls DP are arranged to operatively engage the second toothed ring part 12b of the linking member 60. Thus, the driving pawls DP are formed as a single-latch, while the braking pawls BP are formed as double-latch, preferably integrally.

The driving pawls DP and the braking pawls BP are active in opposite directions and biased in radial direction to engage the second toothed ring part 12b of the linking member 60. As shown, for example, in FIG. 7, each of the driving pawls DP includes a steep surface for engaging the second toothed ring part 12b of the linking member 60 during a driving torque transmission. Each of the braking pawls BP includes a steep surface for engaging the second toothed ring part 12b of the linking member 60 during a braking torque transmission.

During a driving torque transmission via the path P1, the steep surfaces of the driving pawls DP come into torque transmission engagement with the second toothed ring part 12b of the linking member 60 as the output side part 4b of the planet gear carrier 4a, 4b rotates in driving direction. During a driving torque transmission via the path P1, the flattened surfaces of the braking pawls BP slide over the second toothed ring part 12b of the linking member 60 (see FIG. 7). Conversely, during rotating of the output side part 4b of the planet gear carrier 4a, 4b in the braking direction, the steep surfaces of the braking pawls BP come into torque transmission engagement with the second toothed ring part 12b of the linking member 60, while a flattened surfaces of the driving pawls DP slide over the second toothed ring part 12b of the linking member 60 (see FIG. 10). The driving pawls DP and the braking pawls BP are spaced apart from each other in circumferential direction and accommodated in respective recesses in the output side part 4b of the planet gear carrier 4a, 4b of the first planetary gear mechanism 4. Consequently, a compact and slim construction is possible.

The driving path P1 leads from the driving member 2 to the output side part 4b of the planet gear carrier 4a, 4b and from there via the clutch 19 to the linking member 60. The driving path P2 leads from the driving member 2 to the planetary gear mechanism 4 and with involvement of the planet gears 51, 52 to the ring gear 10 and from the ring gear 10 to the linking member 60.

Figure 7:
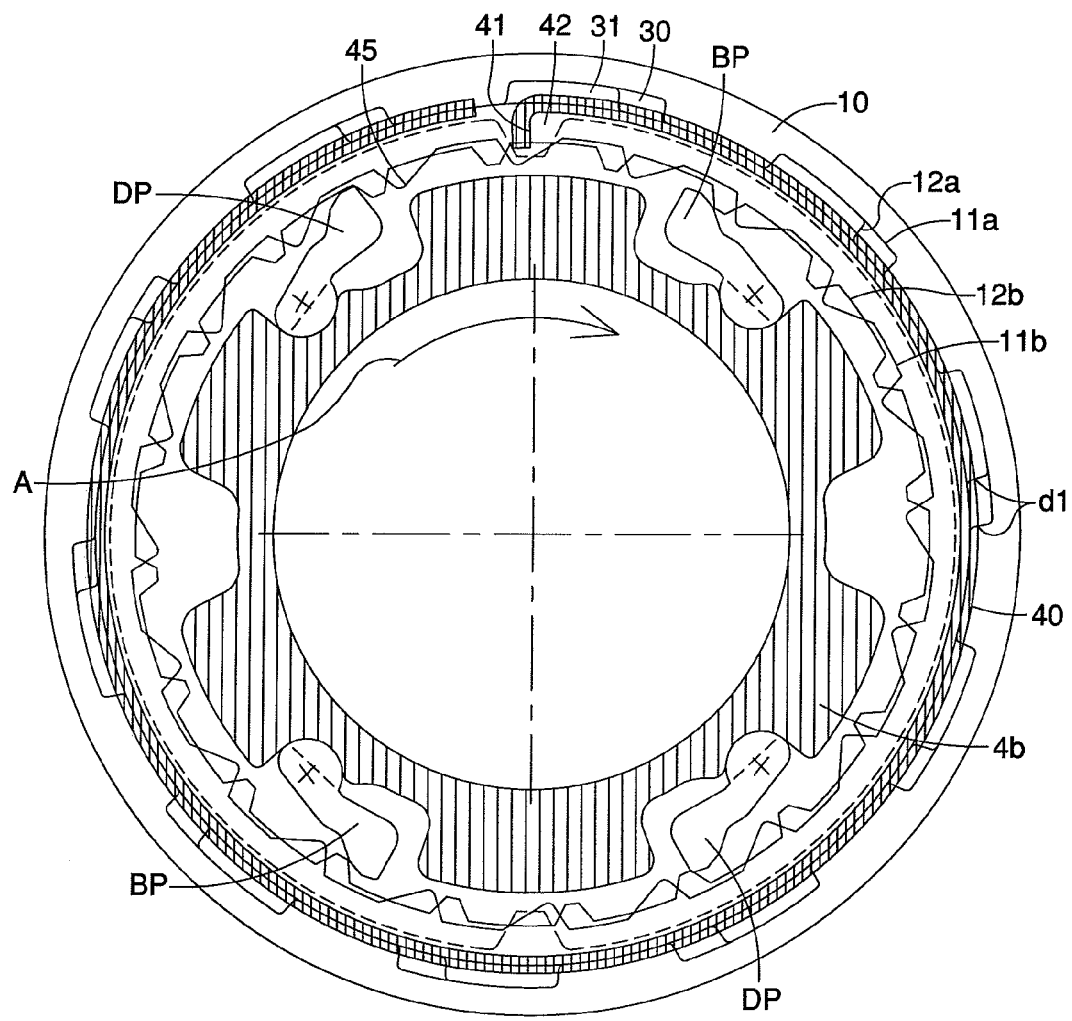
FIG. 7 is a schematic transverse cross sectional view of the hub gearbox through a clutch mechanism of the hub gearbox according to the present invention in a first gear ratio.

The recesses 30 of the first toothed ring part 11a of the toothed ring part arrangement 11a, 11b of the ring gear 10 are in circumferential direction larger than the projections 31, engaging in these recesses 30, of the first toothed ring part 12a of the linking member 60 so that a clearance or gap "d1" is present as shown, for example, in FIG. 7. Consequently, the ring gear 10 is able to rotate relative to the linking member 60 in circumferential direction. Therefore, especially the second toothed ring part 11b of the toothed ring part arrangement 11a, 11b can rotate relative to the second toothed ring part 12b of the linking member 60 and align correspondingly.

The second toothed ring part 11b of the toothed ring part arrangement 11a, 11b of the ring gear 10 has a plurality of projections 45 adapted to deactivate the driving pawls DP and/or the braking pawls BP. During a driving torque transmission via the driving path P2, these projections 45 are arranged in circumferential direction such that the driving pawls DP and/or the braking pawls BP are prevented from coming into a torque transmission engagement with the second toothed ring part 12b of the linking member 60. During a braking torque transmission via the braking path BP1, the braking pawls BP engage the second toothed ring part 12b of the linking member 60 such that the braking torque is transmitted to the braking mechanism 8.

Figure 9:
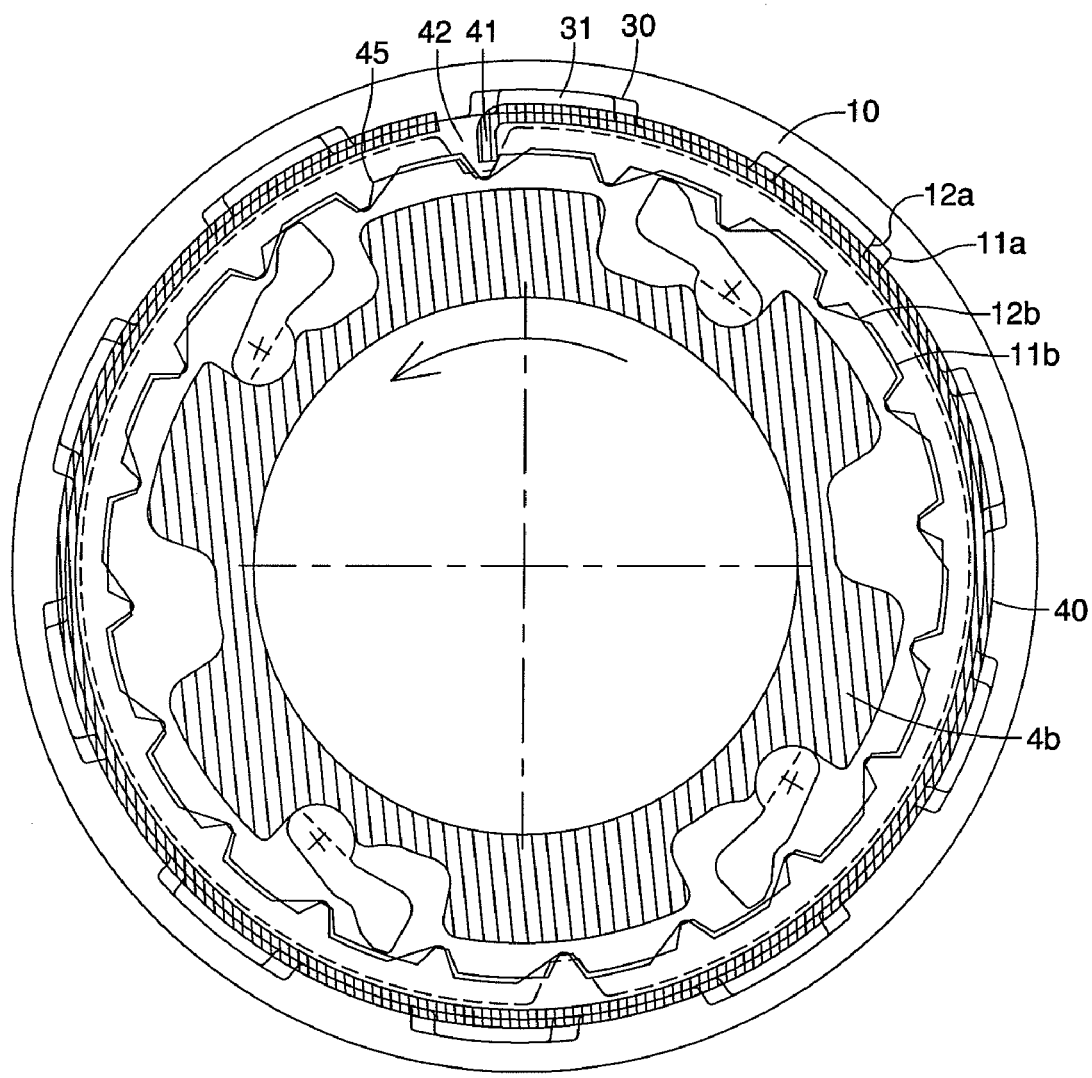
FIG. 9 is a schematic transverse cross sectional view of the hub gearbox through the clutch mechanism of the hub gearbox according to the present invention, if a braking torque is applied starting from the first gear ratio.

As seen in FIG. 9, during a driving or braking torque transmission over the path P1 or BP1, the projections 45 are further arranged in circumferential direction such that the driving pawls DP or the braking pawls BP are able to engage with the second toothed ring part 12b of the linking member 60, such that consequently the transmission of a driving or braking torque is possible through the clutch mechanism.

Further, a ring spring 40 is installed in an inner circumferential groove of the ring gear 10. The ring spring 40 includes a circumferential part with one end having a hook part 41. In other words, the hook part 41 extends from one end of the ring spring 40 radially inwards. The hook part 41 is arranged within a peripheral cavity 42 of the output side part 4b of the planet gear carrier 4a, 4b of the first planetary gear mechanism 4 with a prescribed amount of play between the hook part 41 and the peripheral cavity 42. In other words, the hook part 41 can move in a circumferential direction between a pair of side walls of the cavity 42. The ring spring 40 is expanded or contracted depending on the rotating direction. Thus, the ring spring 40 can be selectively operatively connected to the ring gear 10 by friction or a friction moment that can be produced or removed between them. The ring gear 10 can be selectively rotated for a prescribed amount relative to the linking member 60 by using the friction moment, which occurs between the ring gear 10 and the ring spring 40. Typically, the ring spring 40 rotates due to the hook part 41 engaging the cavity 42 of the driving output side part 4*b* of the planet gear carrier 4*a*, 4*b* of the first planetary gear mechanism 4.

In principle, the function of the ring spring 40 becomes also clear with reference to FIGS. 14 to 19. If the planet gear carrier 4*a*, 4*b* rotates in the driving direction, the ring spring 40 also rotates in the driving direction. Then, the ring gear 10 rotates in the driving direction relative to the linking member 60 by the friction moment of the ring spring 40. In this case, the ring spring 40 expands towards the ring gear 10 causing friction to increase between the ring spring 40 and the ring gear 10. Thus, a friction moment occurs when the ring spring 40 expands towards the ring gear 10 by the rotation of the planet gear carrier 4*a*, 4*b* in a driving direction. However, if the planet gear carrier 4*a*, 4*b* of the first planetary gear mechanism 4 rotates in a braking direction opposite to the driving direction, then the ring spring 40 also rotates in a braking direction. Then, the ring gear 10 rotates in the braking direction relative to the linking member 60 by the friction moment of the ring spring 40. Since in this case the ring spring 40 contracts or shrinks, the friction between the ring spring 40 and the ring gear 10 becomes smaller as compared to the friction occurring in the driving case.

Due to the construction described above, the second toothed ring part 11*b* of the ring gear 10 can rotate relative to the second toothed ring part 12*b* of the linking member 60 or align in circumferential direction. If, for example, the second toothed ring part 11*b* of the ring gear 10 rotates or has rotated in the counterclockwise direction relative to the second toothed ring part 12*b* of the linking member 60, then the braking pawls BP can come into torque transmission engagement with the second toothed ring part 12*b* of the linking member 60. Consequently, the ring gear 10 can rotate relative to the linking member 60 by using friction or friction moment, which can be formed between the ring gear 10 and the ring spring 40 as mentioned above.

The linking member 60 is in engagement with a shaft of a first output clutch 26 on both sides between its input side end and its output side end. The first output clutch 26, which is a one way clutch, can for this purpose be arranged in a pair of circumferential openings or recesses 61, which are located in the linking member 60, as shown, for example, in FIGS. 4 and 6. Adjacent to the first output clutch 26 is a pawl case 29. The pawl case 29 is arranged on the output side of the first output clutch 26 and is operatively connected to an internal toothed ring part of the hub sleeve 3, the first output clutch 26 and the output side end of the linking member 60. During the braking action, the pawl case 29 comes into engagement with the corresponding internal toothed ring part of the hub sleeve 3 and is rotated with the hub sleeve 3. The mode of operation of such the pawl case 29 is known to those skilled in the art.

The linking member 60 contains further at its output side end a toothed ring part 12*c*, which is provided at an inner circumferential surface of the linking member 60 and engaged with the planet gears 55 of the second planetary gear mechanism 5. The linking member 60 couples the first planetary gear mechanism 4 with the second planetary gear mechanism 5 together with the clutch mechanism arranged on the output side of the first planetary gear mechanism 4 such that a permanent synchronization is achieved between the two planetary gear mechanisms 4, 5. In the present embodiment, the linking member 60 includes two different external diameters R1, R2, which results from an oblique stepping or an oblique offset, wherein the input side external diameter R1 is larger than the output side external diameter R2. It is apparent to those skilled in the art from this disclosure that a large external diameter corresponds to a large internal diameter and a small external diameter corresponds to a small internal diameter.

Further, the hub gearbox has an output selector 27, which can be actuated in a longitudinally displaceable manner by using a control device 8 so that the output takes place either via the first output clutch 26 or via the second output clutch 28. Through a corresponding rotary movement of the control device 8 which is operable from the outside, for example, by a control cable and which preferably extends from an input side end area to the output selector 27, the output selector 27 is operated in the longitudinal direction of the fixed shaft 1, as indicated by an arrow A1 in FIG. 1.

The mode of operation of the clutch mechanism is described below with reference to FIGS. 7 to 14. FIGS. 7 to 10 show schematically the parts involved in the clutch mechanism starting from a driving torque transmission with reference to the first gear ratio towards a braking torque transmission. FIGS. 7 to 10 are cross-sections along a line A-A in FIG. 1. FIGS. 11 to 14 show schematically the parts involved in the clutch mechanism starting from a driving torque transmission with reference to the second, third, fourth or fifth gear ratio towards a braking torque transmission. FIGS. 11 to 14 are cross-sections along the line A-A in FIG. 1.

FIG. 7 shows the clutch mechanism in the condition of a driving torque transmission with reference to the first gear ratio. The driving output side part 4*b* of the planet gear carrier 4*a*, 4*b* rotates in the direction of the arrow A. The steep surfaces of the driving pawls DP are engaged with the second toothed ring part 12*b* of the linking member 60, while the braking pawls BP slide over the second toothed ring part 12*b* of the linking member 60 with their flattened surfaces. Thus, the driving pawls DP are active and the braking pawls BP are inactive. The hook part 41 of the ring spring 40 is engaged with a left side wall of the cavity 42 of the driving output side part 4*b*. Consequently, the ring spring 40 rotates with the driving output side part 4*b* such that the ring spring 40 expanding towards the ring gear 10. The ring gear 10 rotates by using friction, which is produced between the ring gear 10 and the ring spring 40. The projections 31 of the first toothed ring part 12*a* of the linking member 60 are left-aligned in the recesses 30 of the first toothed ring part 11*a* of the ring gear 10. Since the projections 31 of the first toothed ring part 12*a* of the linking member 60 have smaller dimensions in circumferential direction than the recesses 30 of the first toothed ring part 11*a* of the ring gear 10, a gap "d1" occurs between each of the corresponding ones of the recesses 30 and the projections 31.

Figure 8:
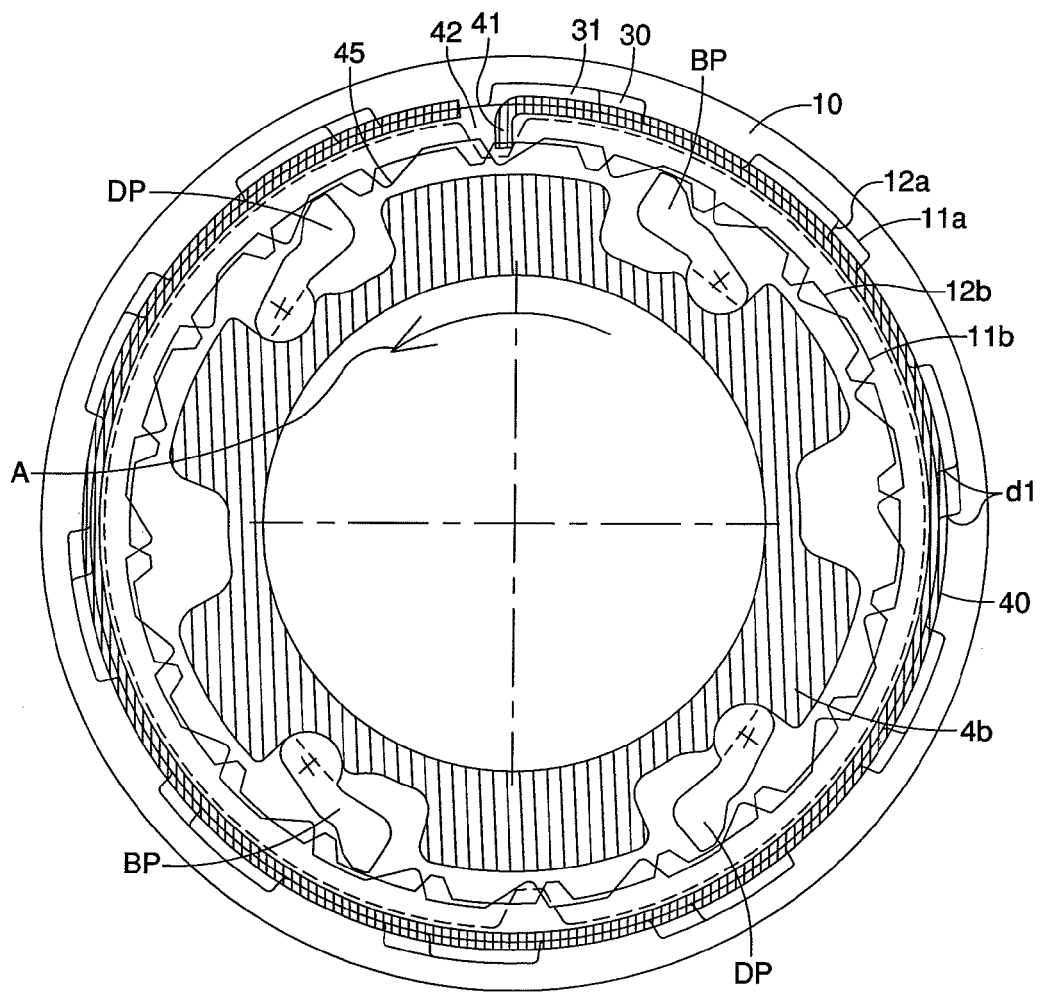
FIG. 8 is a schematic transverse cross sectional view of the hub gearbox through the clutch mechanism of the hub gearbox according to the present invention, if a braking torque is applied starting from the first gear ratio.

FIG. 8 shows the clutch mechanism in the first gear ratio with respect to a driving torque transmission starting from FIG. 7, but with a braking torque being applied by a rider. The driving output side part 4*b* of the planet gear carrier 4*a*, 4*b* now rotates in a braking direction which is opposite to the driving direction, as indicated by the arrow A. The driving pawls DP come out of engagement with the second toothed ring part 12*b* of the linking member 60. The hook part 41 of the ring spring 40 comes into engagement with a right side wall of the cavity 42. The ring spring 40 rotates together with the output side part 4*b* of the planet gear carrier 4*a*, 4*b*. Since the ring spring 40 contracts or shrinks, the friction or the friction moment between the ring spring 40 and the ring gear 10 decreases. However, the friction is still sufficient to rotate the ring spring 40 with the ring gear 10 with the output side part 4b of the planet gear carrier 4a, 4b. In this condition, the braking pawls BP are not yet in a braking torque transmission engagement.

FIG. 9 shows the clutch mechanism in a condition, which follows the condition shown in FIG. 8. The ring gear 10 rotates relative to the linking member 60 due to the reduced friction between the ring spring 40 and the ring gear 10. The projections 31 of the linking member 60 are located in the recesses 30 of the first toothed ring part arrangement 11a in an intermediate position, that is, are not in contact with either of the side walls of the recesses 30. Thus, the ring gear 10 and its second toothed ring part 11b of the toothed ring part arrangement 11a, 11b have rotated so as to become aligned relative to the second toothed ring part 12b of the linking member 60 as shown in FIG. 9.

Figure 10:
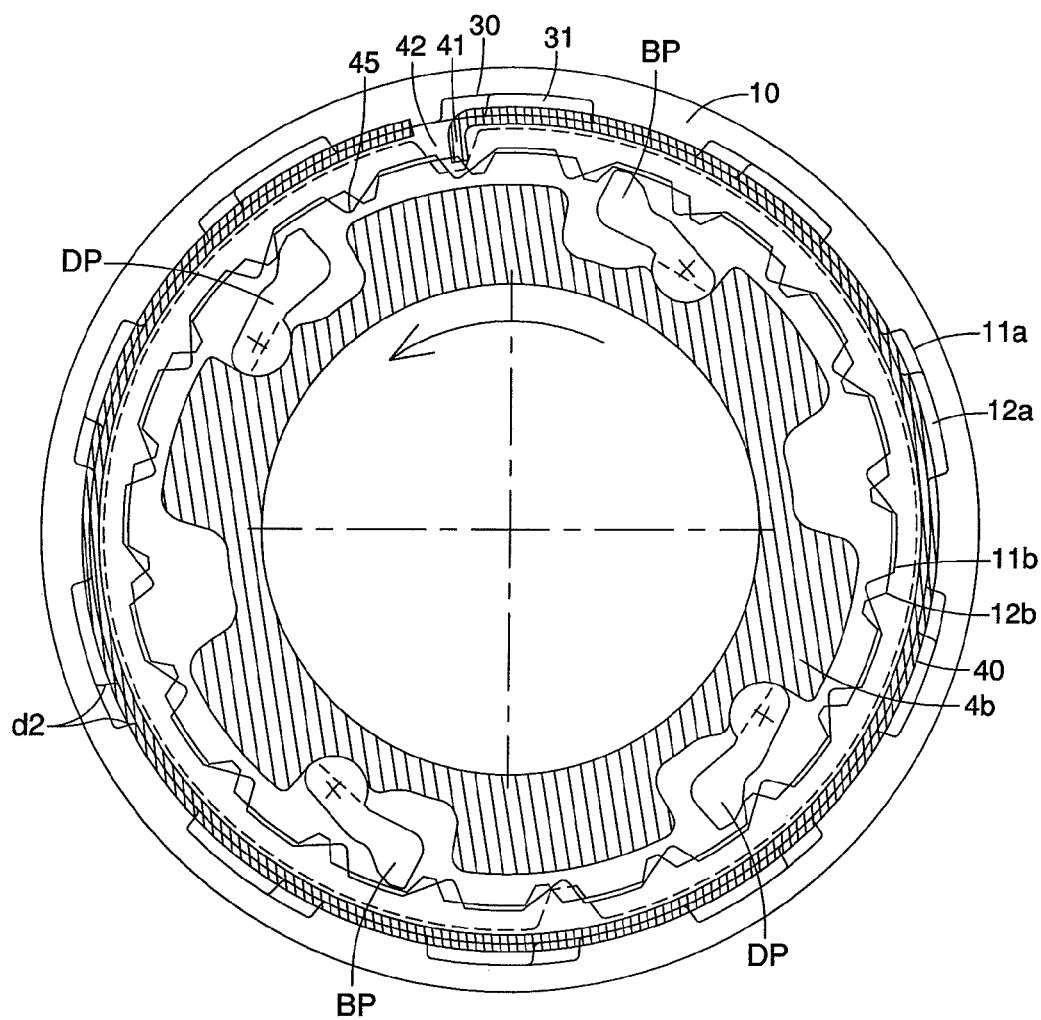
FIG. 10 is a schematic transverse cross sectional view of the hub gearbox through the clutch mechanism of the hub gearbox according to the present invention, if a braking torque is applied starting from the first gear ratio.

FIG. 10 shows the clutch mechanism in a condition, which follows the condition shown in FIG. 9. Now, the braking pawls BP come into engagement with the second toothed ring part 12b of the linking member 60, while the driving pawls DP slide over the second toothed ring part 12b of the linking member 60 with their flattened surfaces. In other words, the braking pawls BP are active and the driving pawls DP are inactive. The projections 31 of the first toothed ring part 12a of the linking member 60 are now right-aligned in the recesses 30. Since the projections 31 are in circumferential direction smaller than the recesses 30, a gap "d2" respectively occurs, which corresponds to "d1" in its size.

FIGS. 11 to 14 show schematically the parts involved in the clutch mechanism starting from a driving torque transmission with reference to the second, third, fourth or fifth gear ratio towards a braking torque transmission. FIGS. 11 to 14 are cross-sections along the line A-A in FIG. 1.

Figure 11:
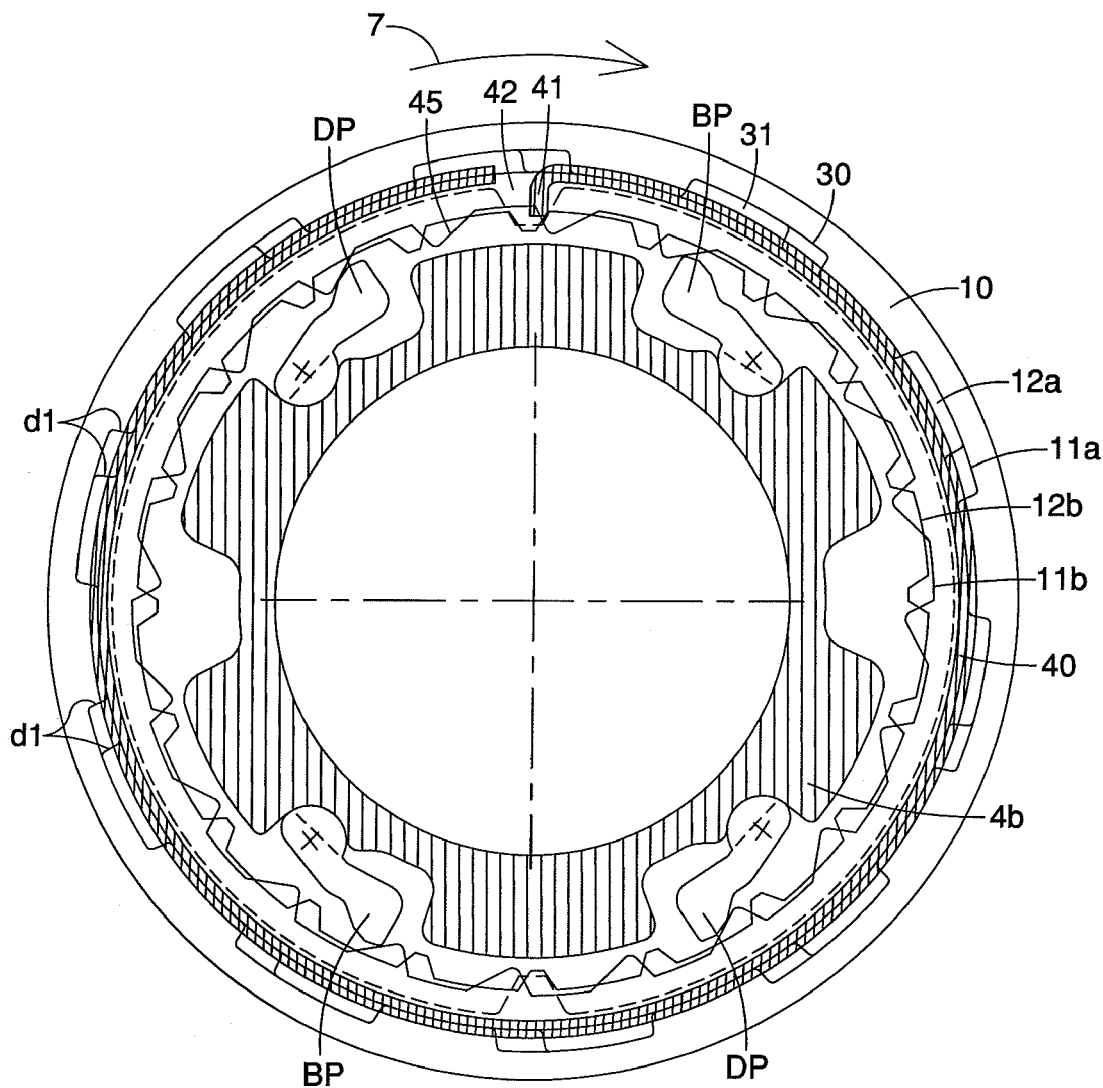
FIG. 11 is a schematic transverse cross sectional view of the hub gearbox through the clutch mechanism of the hub gearbox according to the present invention, in the second, third, fourth or fifth gear ratio.

FIG. 11 shows the clutch mechanism in the condition of a driving torque transmission. This condition corresponds to the driving torque transmission of the second, third, fourth or fifth gear ratio. The driving ring gear 10 rotates in the direction of the arrow A and indeed faster than the output side part 4b of the planet gear carrier 4a, 4b. As shown in FIG. 1 by the path P2 or as shown in FIGS. 16 to 19, the driving torque with reference to the gear ratios two to five runs from the driving member 2 or the input side part 4a of the planet gear carrier 4a, 4b via the first planetary gear mechanism 4 by using the second planet gears 52 to rotate the ring gear 10. The first toothed ring part 11a of the toothed ring part arrangement 11a, 11b of the ring gear 10 is left-aligned engaged with the first toothed ring part 12a of the linking member 60 in a driving torque transferring manner. Since, as already mentioned, the projections 31 of the first toothed ring part 12a of the linking member 60 are in the circumferential direction smaller than the recesses 30 of the first toothed ring part 11a of the ring gear 10, a gap "d1" occurs here too. Furthermore, the hook part 41 of the ring spring 40 is in engagement with the right side wall of the cavity 42 due to the driving ring gear 10 rotating faster than the output side part 4b of the planet gear carrier 4a, 4b in the driving direction of the arrow A in FIG. 11. Neither the driving pawls DP nor the braking pawls BP come into torque transmission connection with the second toothed ring part 12b of the linking member 60. In other words, both the driving pawls DP as well as the braking pawls BP are inactive.

Figure 12:
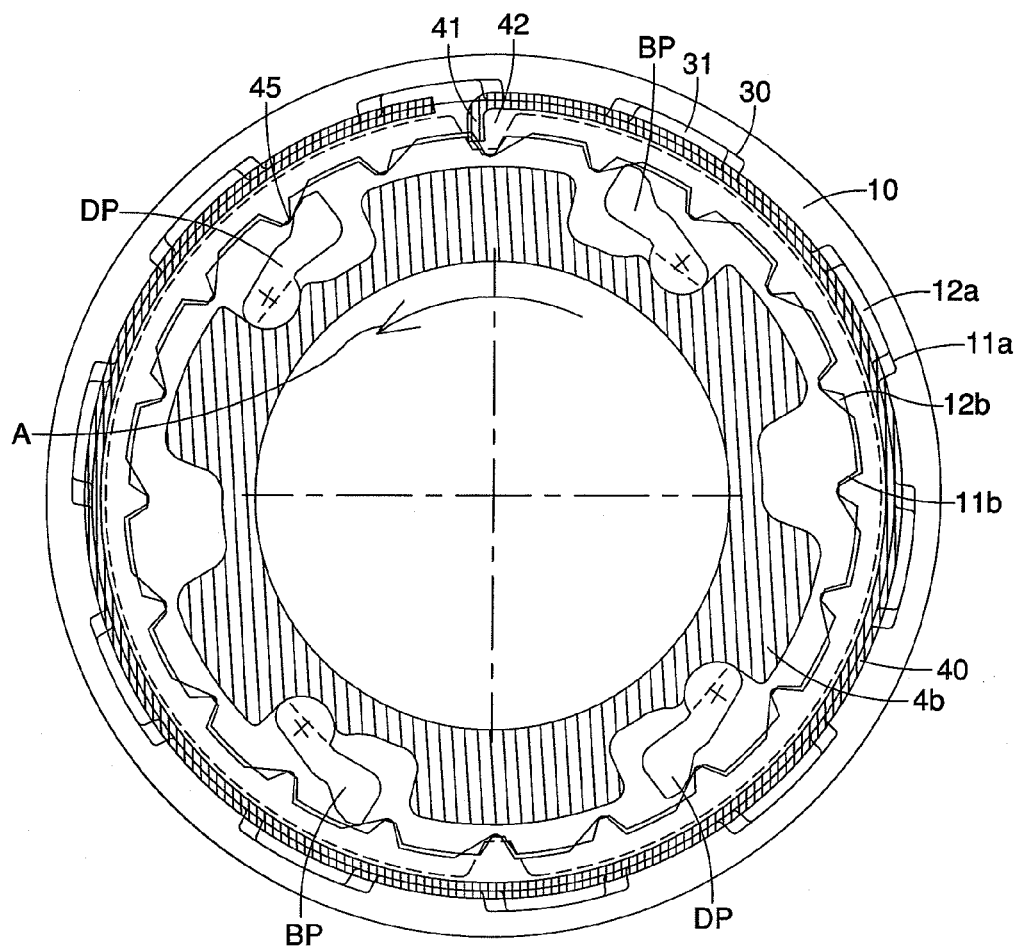
FIG. 12 is a schematic transverse cross sectional view of the hub gearbox through the clutch mechanism of the hub gearbox according to the present invention, if a braking torque is applied starting from the second, third, fourth or fifth gear ratio.

FIG. 12 shows the clutch mechanism in the condition of a braking torque transmission being applied by a rider. This condition starts from a driving torque transmission corresponding to the second, third, fourth or fifth gear ratio, i.e., starting from FIG. 11. The driving output side part 4b of the planet gear carrier 4a, 4b is rotated in the braking direction, which is indicated by the arrow A. The ring gear 10 rotates faster than the output side part 4b of the planet gear carrier 4a, 4b. The hook part 41 of the ring spring 40 comes into engagement with the left side wall of the cavity 42, since the output side part 4b of the planet gear carrier 4a, 4b rotates in the counterclockwise direction with reference to FIG. 12. Now, the ring spring 40 rotates with the output side part 4b of the planet gear carrier 4a, 4b. Since the ring spring 40 contracts or shrinks, the friction or the friction moment between the ring spring 40 and the ring gear 10 decreases. However, the friction is sufficient to rotate the ring spring 40 with the ring gear 10. The projections 31 of the first toothed ring part 12a of the linking member 60 move to intermediate positions in the recesses 30 of the first toothed ring part 11a of the toothed ring part arrangement 11a, 11b of the ring gear 10. In other words, the projections 31 are no longer in contact with the side walls of the recesses 30. In this condition, neither the driving pawls DP nor the braking pawls BP are in a torque transmission engagement with the second toothed ring part arrangement 12b of the linking member 60.

Figure 13:
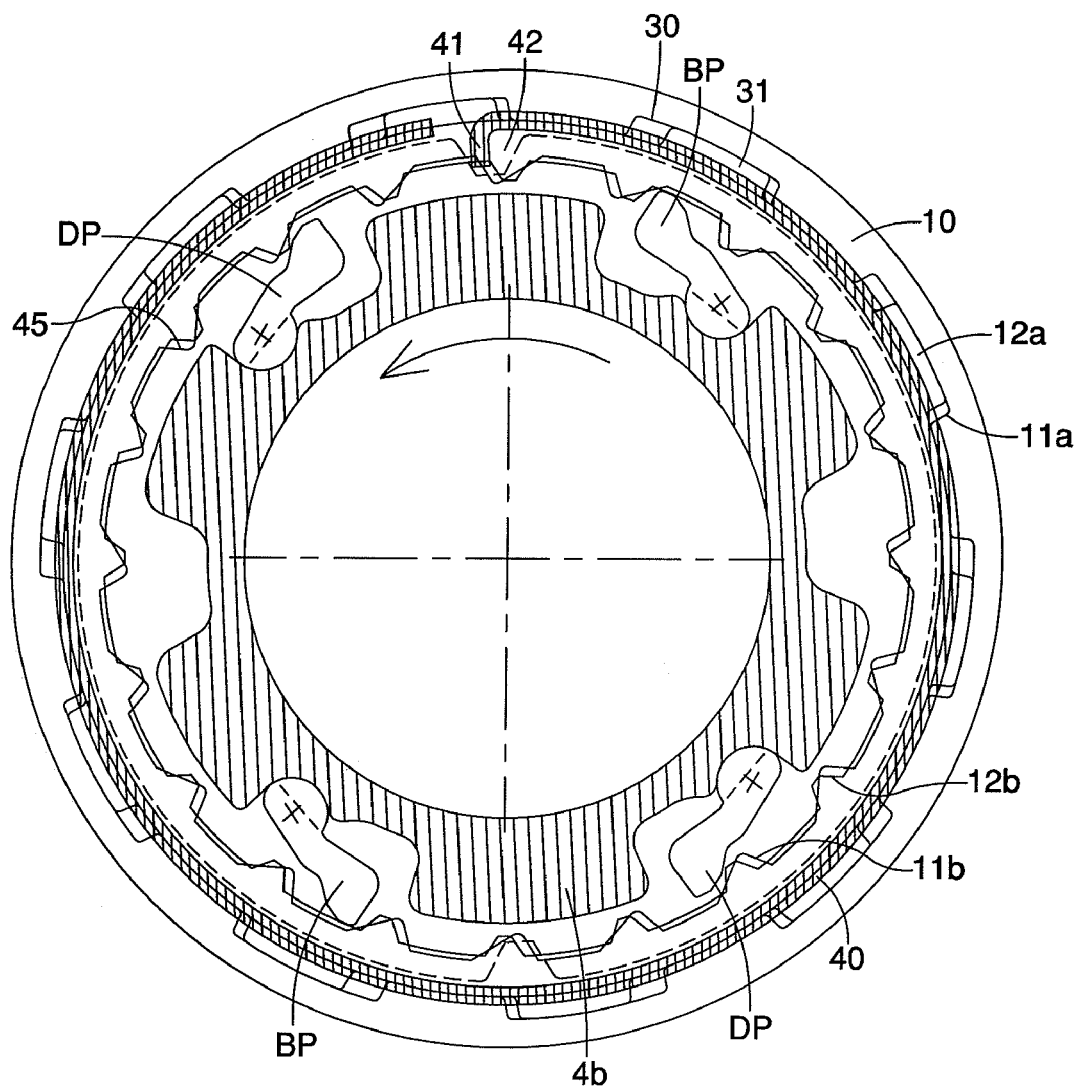
FIG. 13 is a schematic transverse cross sectional view of the hub gearbox through the clutch mechanism of the hub gearbox according to the present invention, if a braking torque is applied starting from the second, third, fourth or fifth gear ratio.

FIG. 13 shows the clutch mechanism in a condition, which follows the condition shown in FIG. 12. The ring gear 10 rotates in the counterclockwise direction relative to the linking member 60 by friction between the ring spring 40 and the ring gear 10. The braking pawls BP begin to engage with the second toothed ring part 12b of the linking member 60. The driving pawls DP slide over the second toothed ring part 12b of the linking member 60 with their flattened surfaces without producing a driving torque transmission. The projections 31 of the linking member 60 are still in intermediate positions in the recesses 30 of the ring gear 10.

Figure 14:
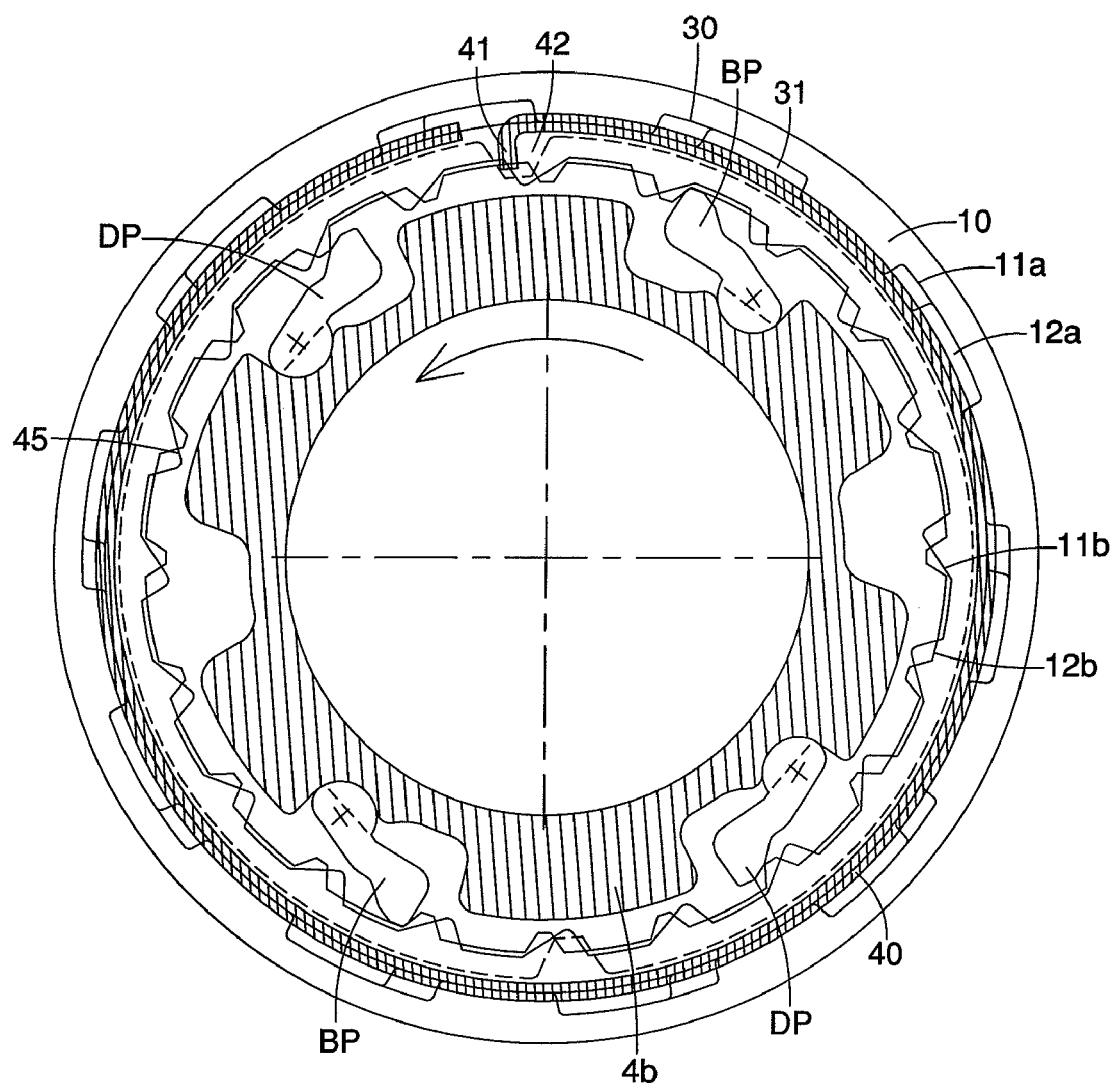
FIG. 14 is a schematic transverse cross sectional view of the hub gearbox through the clutch mechanism of the hub gearbox according to the present invention, if a braking torque is applied starting from the second, third, fourth or fifth gear ratio.

FIG. 14 shows the clutch mechanism in a condition, which follows the condition shown in FIG. 13. Since the ring gear 10 rotates faster than the output side part 4b of the planet gear carrier 4a, 4b, now the projections 31 of the linking member 60 come in contact with the right walls of the recesses 30 of the ring gear 10. The ring gear 10 rotates with the ring spring 40. The ring gear 10 rotates relative to the linking member 60, and thus, the second toothed ring part 11b of the toothed ring part arrangement 11a, 11b of the ring gear 10 rotates relative to the second toothed ring part 12b of the linking member 60. The braking pawls BP are now engaged with the second toothed ring part 12b of the linking member 60 such that the braking torque can be forwarded by using the linking member 60. The driving pawls DP slide over the second toothed ring part 12b of the linking member 60, without producing a torque transmission engagement.

Figure 15:
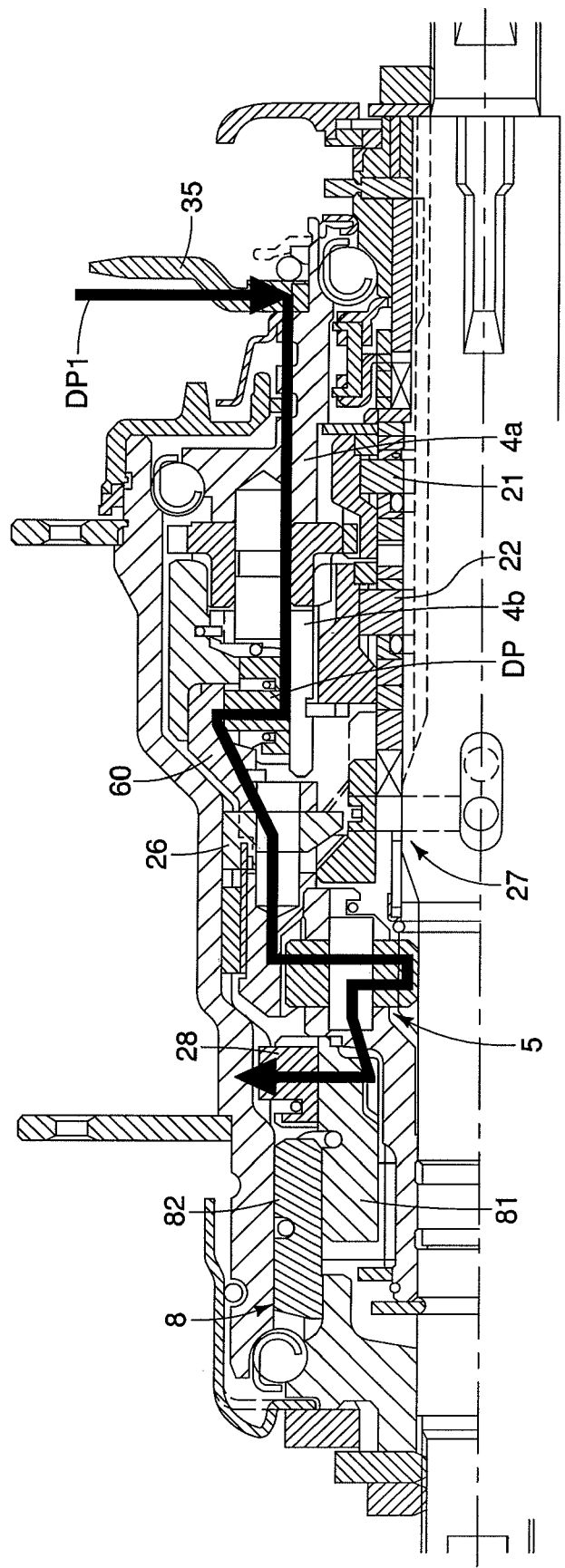
FIG. 15 is a partial schematic longitudinal cross sectional view of the hub gearbox according to the present invention, with depicted driving torque transmission path of the first gear ratio.
Figure 16:
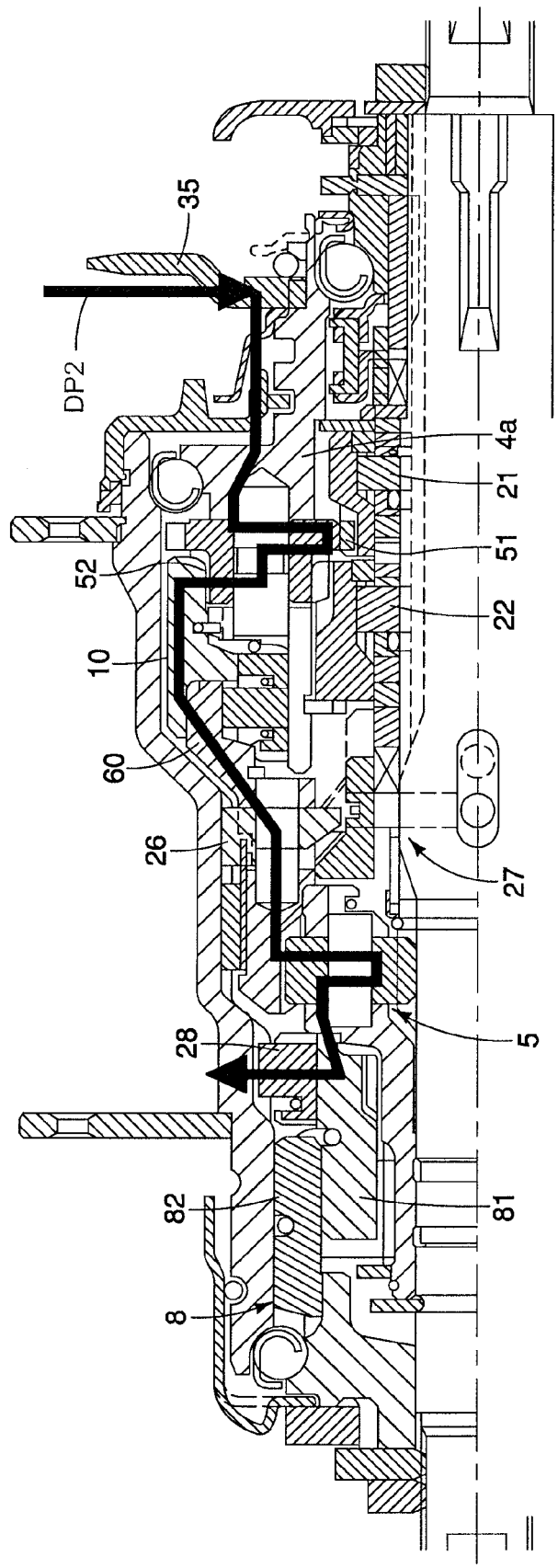
FIG. 16 is a partial schematic longitudinal cross sectional view of the hub gearbox according to the present invention, with depicted driving torque transmission path of the second gear ratio.
Figure 17:
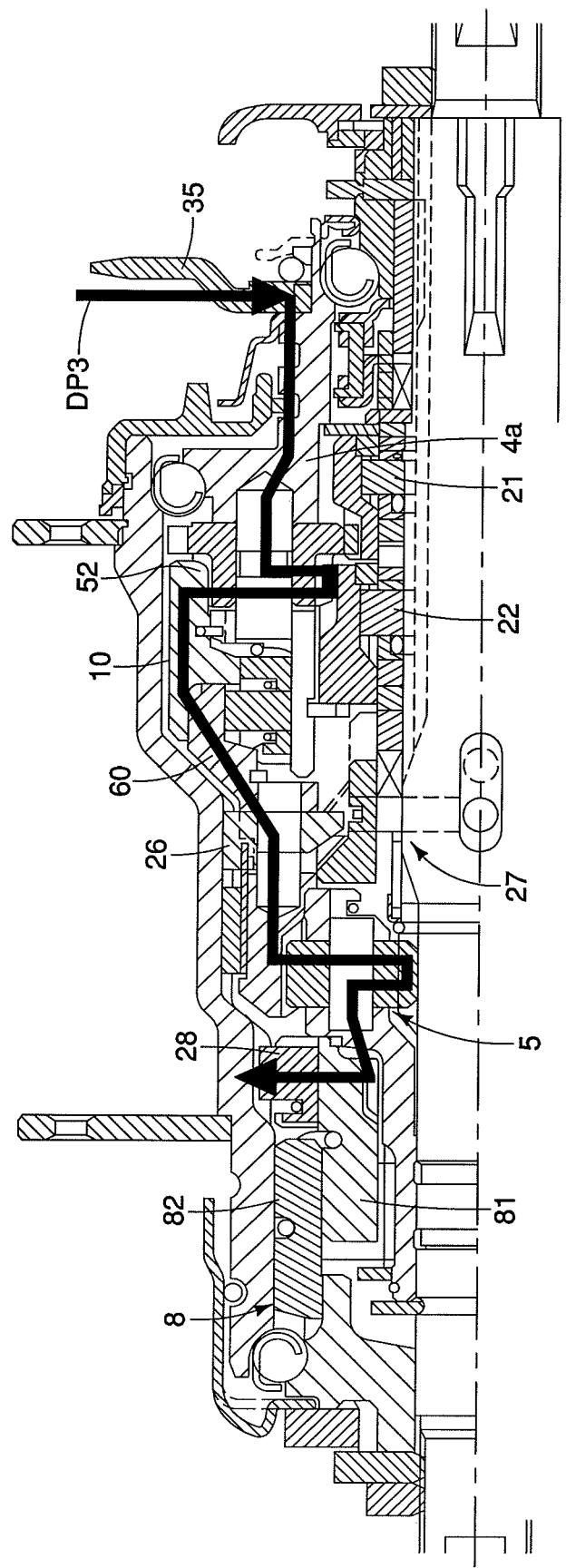
FIG. 17 is a partial schematic longitudinal cross sectional view of the hub gearbox according to the present invention, with depicted driving torque transmission path of the third gear ratio.
Figure 18:
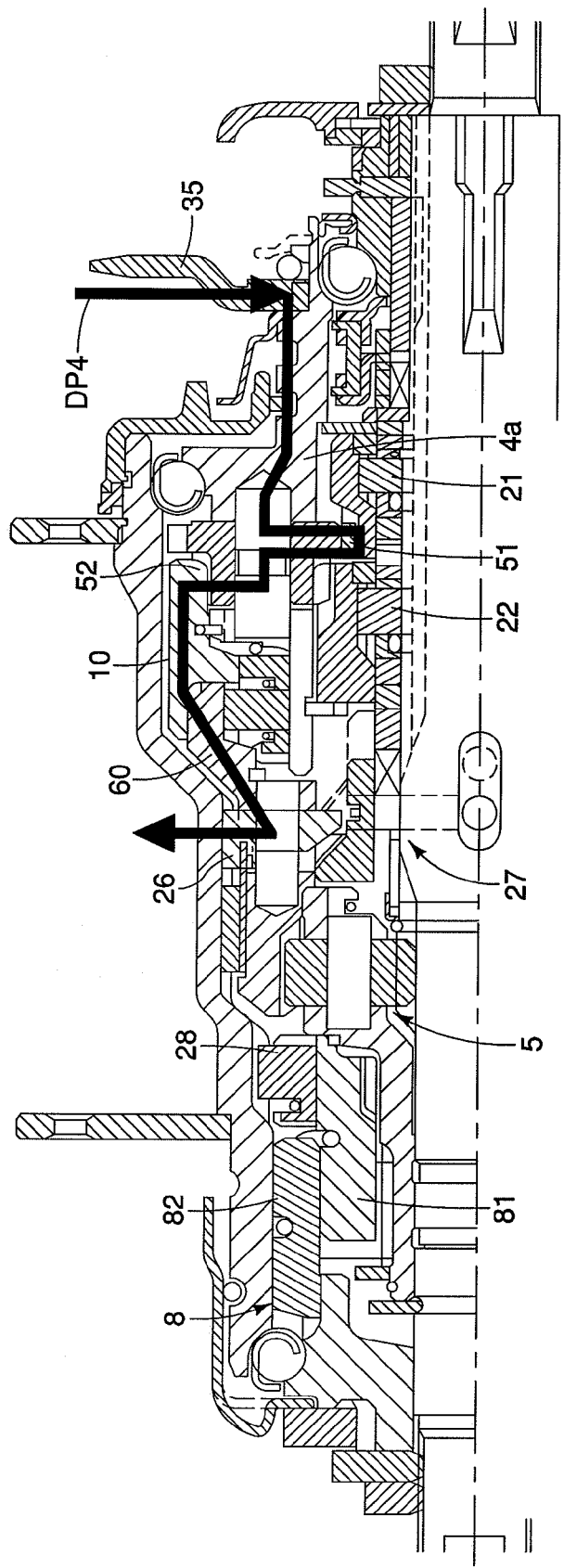
FIG. 18 is a partial schematic longitudinal cross sectional view of the hub gearbox according to the present invention, with depicted driving torque transmission path of the fourth gear ratio.
Figure 19:
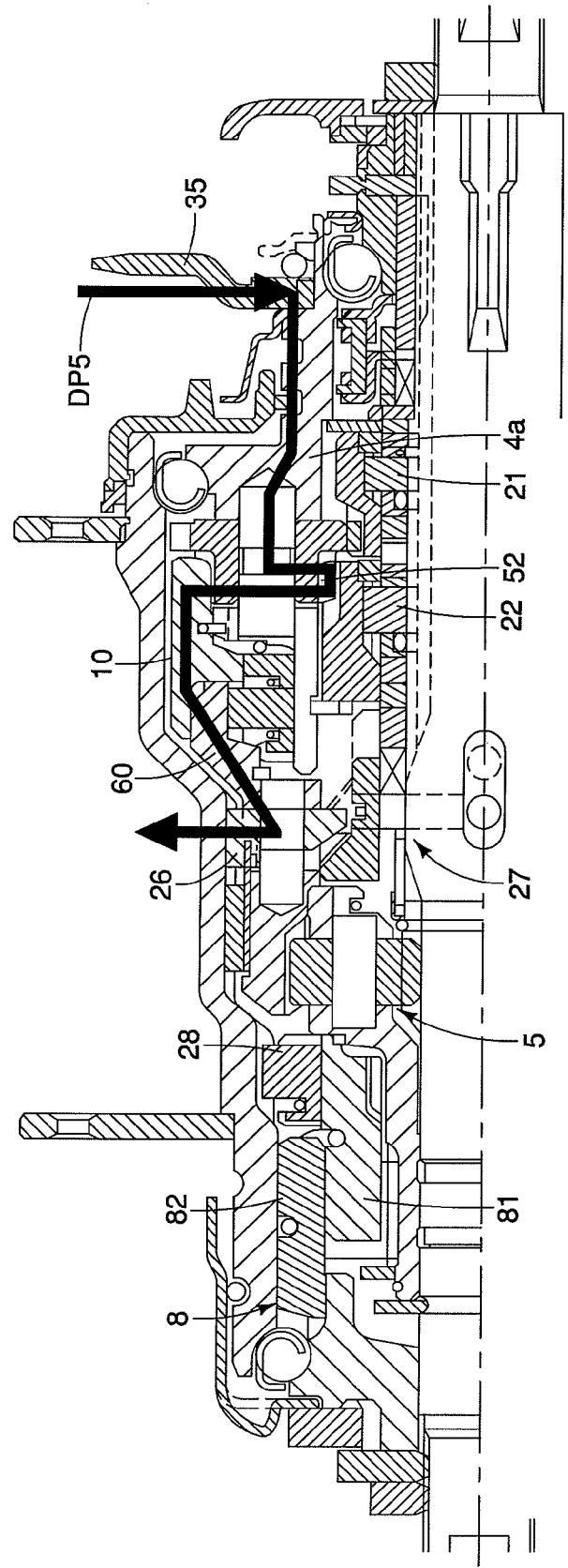
FIG. 19 is a partial schematic longitudinal cross sectional view of the hub gearbox according to the present invention, with depicted driving torque transmission path of the fifth gear ratio.

As shown in FIGS. 15 to 19, the driving torque, which is introduced by the driving member 2 (the input side part 4a of the planetary gear carrier 4a, 4b of the first planetary gear mechanism 4) is transmitted to the hub sleeve 3 over different paths. In FIGS. 15 to 19, only essential components are provided with reference number. A path DP1 in FIG. 15 represents the transmission path of the driving torque of the first gear ratio from the sprocket 35 via the hub gearbox to the hub sleeve 3. A path DP2 in FIG. 16 represents the transmission path of the driving torque of the second gear ratio from the sprocket 35 via the hub gearbox to the hub sleeve 3. A path DP3 in FIG. 17 represents the transmission path of the driving torque of the third gear ratio from the sprocket 35 via the hub gearbox to the hub sleeve 3. A path DP4 in FIG. 18 represents the transmission path of the driving torque of the fourth gear ratio from the sprocket 35 via the hub gearbox to the hub sleeve 3. A path DP5 in FIG. 19 represents the transmission path of the driving torque of the fifth gear ratio from the sprocket 35 via the hub gearbox to the hub sleeve 3.

In the following Table 1, a condition is indicated with the sign "−", in which the clutches are not in operating condition, which means that they do not transmit a driving torque. A condition is indicated with the sign "○", in which the clutches are in operating condition, which means that they transmit a driving torque. As it can be seen from FIGS. 15 to 19 in connection with the driving paths DP1 to DP5, the second output clutch 28 transmits a driving torque whenever the driving torque takes a path via the second planetary gear mechanism 5. The sign "X" indicates a condition, in which the second output clutch 28 transmits the driving torque. The sign "n" indicates a condition, in which the second output clutch 28 transmits no driving torque.

TABLE 1

|  | Clutch | | | | |
| Gear Ratio (speed) | 21 | 22 | DP | 26 | 28 |
| --- | --- | --- | --- | --- | --- |
| 1 | — | — | ○ | — | X |
| 2 | ○ | — | — | — | X |
| 3 | — | ○ | — | — | X |
| 4 | ○ | — | — | ○ | n |
| 5 | — | ○ | — | ○ | n |

The clutch mechanism enables to transmit the braking torque to the braking mechanism 8 always via the same path DP1 or BP 1 independent of the selected gear ratio. The resulting braking effect is not influenced by the gear ratio from which the rider applies a braking torque. Consequently, the braking action is more comfortable and at the same time more safety for the rider.

Figure 20:
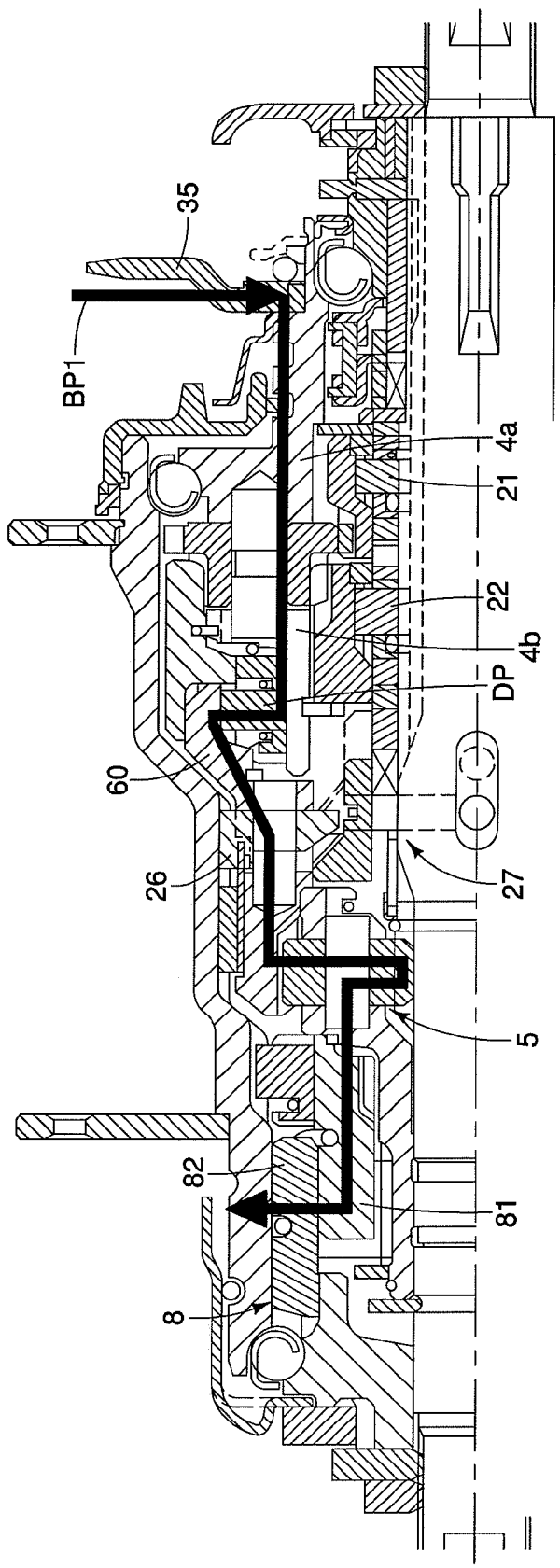
FIG. 20 is a partial schematic longitudinal cross sectional view of the hub gearbox according to the present invention, with depicted braking torque transmission path.

The entire braking torque transmission path BP1 from the sprocket 35 to the braking mechanism 8 is shown in FIG. 20. In the present embodiment, the braking torque transmission path BP1 corresponds substantially to the driving torque transmission path DP1 of the first gear ratio, but the torque to the hub sleeve 3 by the brake mechanism 8 instead of by the second output clutch 28.

The construction described above further enables that the first and second planetary gear mechanisms 4 to be coupled with each other such that a permanent synchronization is achieved between them. Consequently, the gear change is more comfortable for the rider whereby the riding feel during the gear change is improved at the same time. It is also favorable that the second planetary gear mechanism 5 is not controlled with effort by using a mechanism, which usually consists of sun gear clutches controlled with a control device or a complicated clutch mechanism provided on the driver side of this planetary gear mechanism. All this is possible although the described construction is simple, compact, slim and still reliable in operation.

The embodiment described above includes two planetary gear mechanisms. However, it is apparent to persons skilled in the art that the invention is not restricted to two planetary gear mechanisms but can also be used with three or more planetary gear mechanisms. Further, the invention is not restricted to a first two-step planetary gear mechanism and a second one-step planetary gear mechanism. Moreover, the number of, the stepping as well as the positioning of the planetary gear mechanisms can be adapted for the respective requirements, as, for example, the number of gear ratios, step-up gearing/reduction gearing etc. Therefore, the braking torque path can also be another than that of the first gear ratio. Furthermore, the components described as preferably integral can also be made in several parts, if required.

In understanding the scope of the present invention, the foregoing also applies to words having similar meanings such as the terms, "including", "having" and their derivatives. Also, the terms "part," "section," "portion," "member" or "element" when used in the singular can have the dual meaning of a single part or a plurality of parts. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle hub gearbox comprising:
   a first planetary gear mechanism;
   a second planetary gear mechanism operatively coupled with the first planetary gear mechanism;
   a braking mechanism selectively coupled to the first planetary gear mechanism; and
   a clutch mechanism selectively coupling an output side of the first planetary gear mechanism to an input side of the second planetary gear mechanism to selectively transmit either a driving torque applied by a rider in a driving direction depending on a selected gear ratio or a braking torque applied by the rider in a braking direction to the braking mechanism independent of a selected gear ratio via one path,
   the clutch mechanism including
      a ring gear with ring teeth engaged with a planet gear of the first planetary gear mechanism, and a toothed ring arrangement that is offset in an axial direction from the ring teeth,
      a linking member having a part selectively connected to the second planetary gear mechanism,
      a first toothed ring part of the linking member selectively engaged with a first toothed ring part of the toothed ring arrangement of the ring gear,
      a second toothed ring part on the output side of the clutch mechanism,
      a driving pawl and a braking pawl active in opposite rotational directions, with the driving pawl and the braking pawl being disposed on an output side part of a planet gear carrier of the first planetary gear mechanism,
   the first toothed ring part of the ring gear having a plurality of recesses arranged in a circumferential direction, and the first toothed ring part of the linking member having a plurality of projections located in the recesses, with the recesses and the projections being configured with circumferential spacings therebetween to provide a limited range of relative circumferential rotation between the linking member and the ring gear.

2. The bicycle hub gearbox according to claim 1, wherein the driving pawl and the braking pawl selectively connect the planet gear carrier of the first planetary gear mechanism to the second toothed ring part of the linking member in a torque transferring manner.

3. The bicycle hub gearbox according to claim 2, wherein the driving pawl and the braking pawl are arranged in respective peripheral recesses at the output side part of the planet gear carrier of the first planetary gear mechanism and biased in a radial direction to engage the second toothed ring part of the linking member such that the driving pawl and the braking pawl are active in the opposite rotational directions.

4. The bicycle hub gearbox according to claim 3, wherein the output side part of the planet gear carrier of the first planetary gear mechanism is operatively connected in a circumferential direction to the ring gear by using a ring spring.

5. The bicycle hub gearbox according to claim 4, wherein the input side part of the planet gear carrier of the first planetary gear mechanism serves as a rotatable driving member.

6. A bicycle hub gearbox comprising:
a first planetary gear mechanism;
a second planetary gear mechanism operatively coupled with the first planetary gear mechanism;
a braking mechanism selectively coupled to the first planetary gear mechanism; and
a clutch mechanism selectively coupling an output side of the first planetary gear mechanism to an input side of the second planetary gear mechanism to selectively transmit either a driving torque applied by a rider in a driving direction depending on a selected gear ratio or a braking torque applied by the rider in a braking direction to the braking mechanism independent of a selected gear ratio via one path,
the clutch mechanism including
a ring gear with ring teeth engaged with a planet gear of the first planetary gear mechanism, and a toothed ring arrangement that is offset in an axial direction from the ring teeth,
a linking member having a part selectively connected to the second planetary gear mechanism, a first toothed ring part of the linking member selectively engaged with a first toothed ring part of the toothed ring arrangement of the ring gear, and a second toothed ring part on the output side of the clutch mechanism,
a driving pawl and a braking pawl with the driving pawl and the braking pawl being disposed on an output side part of a planet gear carrier of the first planetary gear mechanism such that the driving pawl and the braking pawl selectively connect the planet gear carrier of the first planetary gear mechanism to the second toothed ring part of the linking member in a torque transferring manner,
the driving pawl and the braking pawl being arranged in respective peripheral recesses at the output side part of the planet gear carrier of the first planetary gear mechanism and biased in a radial direction to engage the second toothed ring part of the linking member such that the driving pawl and the braking pawl are active in opposite rotational directions,
the output side part of the planet gear carrier of the first planetary gear mechanism being operatively connected in a circumferential direction to the ring gear by using a ring spring,
the input side part of the planet gear carrier of the first planetary gear mechanism serving as a rotatable driving member,
the first toothed ring part of the ring gear having a plurality of recesses arranged in a circumferential direction, and
the first toothed ring part of the linking member having a plurality of projections located in the recesses, with the recesses and the projections being configured with circumferential spacings therebetween to provide a limited range of relative circumferential rotation between the linking member and the ring gear.

7. The bicycle hub gearbox according to claim 6, wherein the ring gear is configured to rotate relative to the linking member such that a second toothed ring part of the ring gear aligns with the second toothed ring part of the linking member.

8. The bicycle hub gearbox according to claim 7, wherein the second toothed ring part of the ring gear includes a plurality of projections arranged to deactivate the braking pawl such that the braking pawl is prevented from a torque transferring engagement with the second toothed ring part of the linking member during one selected driving torque transmission path in which the ring gear is in a deactivating position, and to activate the braking pawl such that engagement of the braking pawl with the second toothed ring part of the linking member is allowed during a braking torque transmission in which the ring gear is in an activating position.

9. The bicycle hub gearbox according to claim 8, wherein the projections of the ring gear are arranged such that, during a selected driving or braking torque transmission path, at least one of the driving pawl and the braking pawl is engageable with the second toothed ring part of the linking member.

10. The bicycle hub gearbox according to claim 9, wherein the ring spring includes a hook arranged within a peripheral cavity of the output side part of the planet gear carrier of the first planetary gear mechanism, the cavity and the hook being dimensioned such that the hook alternately engages opposite sides of the peripheral cavity in response to relative rotation between the linking member and the ring gear.

11. The bicycle hub gearbox according to claim 10, wherein
the ring spring has a ring part disposed in an inner circumferential groove of the ring gear.

12. The bicycle hub gearbox according to claim 11, further comprising
an output selector configured to be longitudinally displaceable by a control device; and
a hub sleeve selectively coupled by the output selector to one of the first output clutch and a second output clutch.

13. The bicycle hub gearbox according to claim 12, further comprising
a braking part connected to a roller case with the braking part being pushed radially outward during a braking operation.

14. The bicycle hub gearbox according to claim 13, wherein
at least one sun gear clutch is arranged between a sun gear of the first planetary gear mechanism and a fixed shaft, with the sun gear clutch being actuatable by the control device.

15. The bicycle hub gearbox according to claim 14, wherein
the linking member operatively connects the first and second planetary gear mechanisms such that a permanent synchronization is achieved between the planetary gear mechanisms.

16. The bicycle hub gearbox according to claim 15, wherein
the sun gear clutch and the output selector are actuatable by the control device to selectively attain a plurality of gear ratios.

17. The bicycle hub gearbox according to claim 16, wherein the first planetary gear mechanism has two-steps and the second planetary gear mechanism has one step to provide a five-speed gear hub.

18. The bicycle hub gearbox according to claim 17, wherein
the braking torque transmission path corresponds to the transmission path of the first gear ratio, except that the braking mechanism is engaged with the hub sleeve and the second output clutch is disengaged from the hub sleeve.

19. A bicycle hub gearbox comprising:
a first planetary gear mechanism;
a second planetary gear mechanism operatively coupled with the first planetary gear mechanism;
a braking mechanism selectively coupled to the first planetary gear mechanism; and
a clutch mechanism selectively coupling an output side of the first planetary gear mechanism to an input side of the second planetary gear mechanism to selectively transmit either a driving torque applied by a rider in a driving direction depending on a selected gear ratio or a braking torque applied by the rider in a braking direction to the braking mechanism independent of a selected gear ratio via one path,
the clutch mechanism including
a ring gear with ring teeth engaged with a planet gear of the first planetary gear mechanism, a toothed ring arrangement that is offset in an axial direction from the ring teeth,
a linking member having a part selectively connected to the second planetary gear mechanism,
a first toothed ring part selectively engaged with a first toothed ring part of the toothed ring arrangement of the ring gear, and
a second toothed ring part on the output side of the clutch mechanism,
the first toothed ring part of the linking member of the ring gear having a plurality of recesses arranged in a circumferential direction, and the first toothed ring part of the linking member having a plurality of projections located in the recesses, with the recesses and the projections being configured with circumferential spacings therebetween to provide a limited range of relative circumferential rotation between the linking member and the ring gear.

* * * * *